(12) United States Patent
Yanai (10) Patent No.: US 12,080,203 B2
(45) Date of Patent: Sep. 3, 2024

(54) PROJECTION IMAGE DISPLAYING METHOD AND A NON-TRANSITORY COMPUTER-READABLE STORAGE MEDIUM STORING PROGRAM

(71) Applicant: SEIKO EPSON CORPORATION, Tokyo (JP)

(72) Inventor: Kohei Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/682,156

(22) Filed: Feb. 28, 2022

(65) Prior Publication Data

US 2022/0277674 A1 Sep. 1, 2022

(30) Foreign Application Priority Data

Mar. 1, 2021 (JP) ................................. 2021-031442

(51) Int. Cl.
*G09G 3/00* (2006.01)
*G06F 3/04883* (2022.01)

(52) U.S. Cl.
CPC ......... *G09G 3/002* (2013.01); *G06F 3/04883* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 6,326,954 B1* | 12/2001 | Van Ieperen | ....... | G06F 3/04883 345/173 |
| 2004/0032906 A1* | 2/2004 | Lillig | ....... | G06T 7/12 358/464 |
| 2008/0266321 A1* | 10/2008 | Aufranc | ....... | H04N 9/3179 353/30 |
| 2010/0315602 A1* | 12/2010 | Takahashi | ....... | H04N 9/3185 353/101 |
| 2017/0214894 A1* | 7/2017 | Tamura | ....... | H04N 9/3185 |
| 2018/0167593 A1 | 6/2018 | Narikawa et al. | | |
| 2020/0020108 A1* | 1/2020 | Pao | ....... | G06V 10/50 |
| 2020/0098090 A1* | 3/2020 | Nonaka | ....... | G06T 7/11 |
| 2020/0364913 A1* | 11/2020 | Bradski | ....... | G06V 10/774 |

(Continued)

FOREIGN PATENT DOCUMENTS

| | | | |
|---|---|---|---|
| JP | 2010206671 A | * | 9/2010 |
| JP | 2011-082798 A | | 4/2011 |
| JP | 2012-099070 A | | 5/2012 |

(Continued)

OTHER PUBLICATIONS

Lightform Guide "The Interface.".

(Continued)

*Primary Examiner* — Patrick F Valdez
(74) *Attorney, Agent, or Firm* — Oliff PLC (57) ABSTRACT

A displaying method including receiving an input of a threshold value, generating, by using the threshold value, a second image showing a mask region of a first image that is a region where an input image is displayed or a non-mask region of the first image that is a region where the input image is not displayed, and displaying a projection image obtained by superimposing the second image on the input image.

13 Claims, 6 Drawing Sheets

(56) References Cited

U.S. PATENT DOCUMENTS

2020/0381121 A1\* 12/2020 Wang ................ G06N 3/045

FOREIGN PATENT DOCUMENTS

| JP | 2017-091298 A | 5/2017 |
| JP | 2017-228146 A | 12/2017 |
| JP | 2018-097165 A | 6/2018 |
| JP | 2020-052530 A | 4/2020 |

OTHER PUBLICATIONS

Hiroshi Ishikawa, "Graph Cut," CVIM SIG Tutorial, Mar. 2007/ IPSJ SIG Technical Reports, 2007-CVIM-158-(26), pp. 193-204.
Vezhnevets et al., "GrowCut—Interactive Multi-Label N-D Image Segmentation by Cellular Automata," 7 pages.
Nakashima, Yoshito, "Introduction to Growcut, an Image Segmentation Algorithm Applied to Liquefaction Images", Journal of Geography(Chigaku Zasshi), vol. 126, No. (6), pp. 785-794 (2017).
Nakano, Taro et al., "Research on Simplified Non-Contact 3D Scanning Technology (Part 2)," Research Report from Industrial Technology Center of Saga in 2015.

\* cited by examiner

PROJECTION IMAGE DISPLAYING METHOD AND A NON-TRANSITORY COMPUTER-READABLE STORAGE MEDIUM STORING PROGRAM

The present application is based on, and claims priority from JP Application Serial Number 2021-031442, filed Mar. 1, 2021, the disclosure of which is hereby incorporated by reference herein in its entirety.

BACKGROUND

1. Technical Field

The present disclosure relates to a displaying method and a program.

2. Related Art

For example, JP-A-2012-99070 discloses a subject detection method for detecting a subject based on an input image. The subject detection method of JP-A-2012-99070 includes acquiring a feature amount from an input image, generating, based on the feature amount, a probability distribution image indicating a presence probability of a subject, and detecting the subject by comparing the probability distribution image with a threshold value stored in advance.

In JP-A-2012-99070, since the threshold value stored in advance is used for the detection of the subject, a region where a user truly wants to detect may not be detected. Therefore, in the related art, it is not possible to easily adjust the region in accordance with a sensitivity of the user.

SUMMARY

A displaying method according to an aspect of the present disclosure includes: receiving an input of a threshold value; generating, by using the threshold value, a second image showing a mask region of a first image that is a region of where an input image is displayed or a non-mask region of the first image that is a region where the input image is not displayed; and displaying a projection image obtained by superimposing the second image on the input image.

A non-transitory computer-readable storage medium according to an aspect of the present disclosure stores a program causing a computer to: receive an input of a threshold value; generate, by using the threshold value, a second image showing a mask region of a first image that is a region where an input image is displayed or a non-mask region of the first image that is a region where the input image is not displayed; and display a projection image obtained by superimposing the second image on the input image.

DESCRIPTION OF EXEMPLARY EMBODIMENTS

Hereinafter, suitable embodiments of the present disclosure will be described with reference to accompanying drawings. In the drawings, dimensions or scales of respective parts are appropriately different from actual dimensions or scales, and a part is schematically shown in order to facilitate understanding. The scope of the present disclosure is not limited to these embodiments unless it is stated in the following description that the present disclosure is particularly limited.

1. First Embodiment

Figure 1:
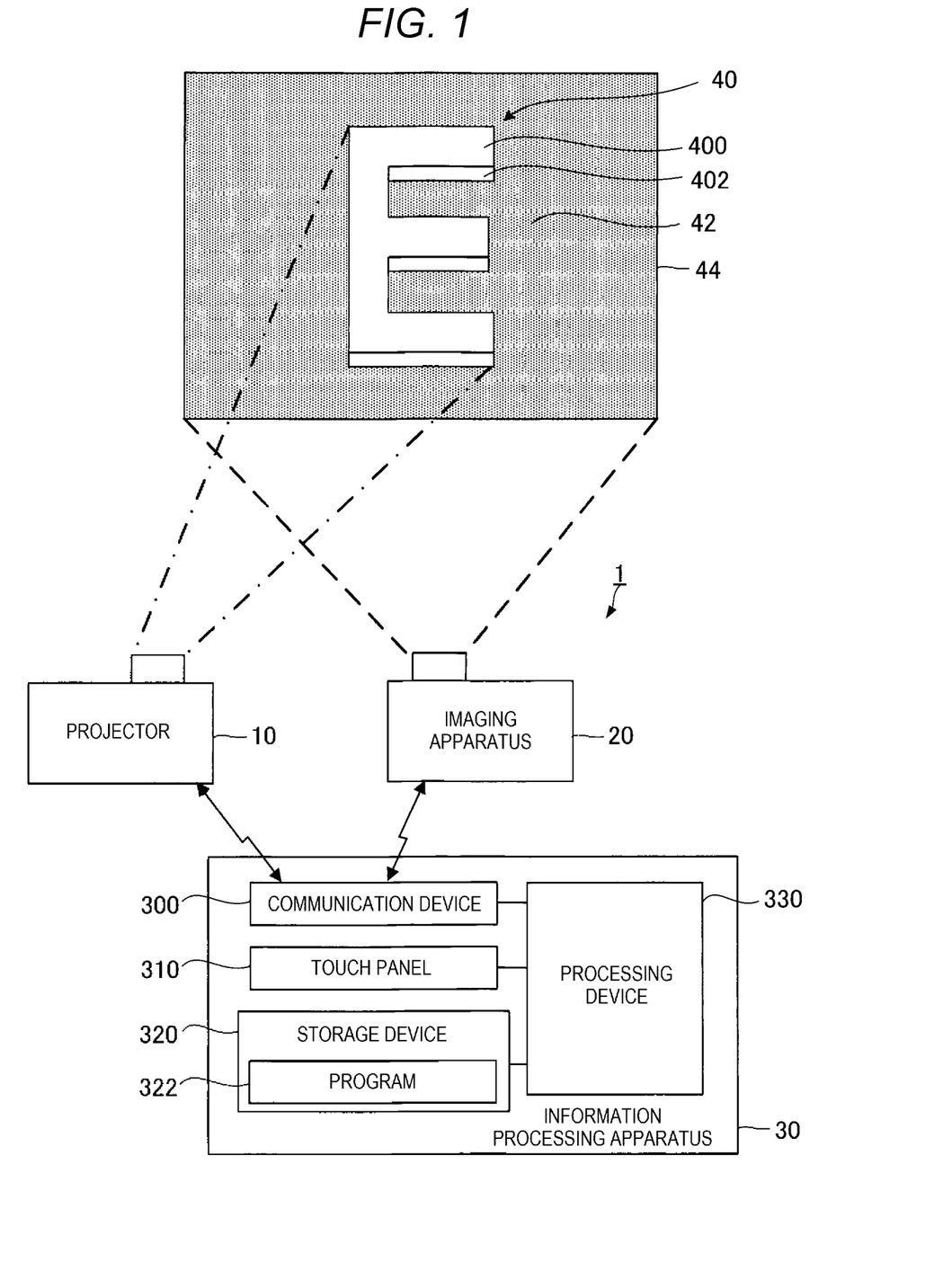
FIG. 1 is a schematic diagram showing an example of a projection system according to an embodiment.

FIG. 1 is a schematic diagram showing an example of a projection system 1 according to an embodiment. As shown in FIG. 1, the projection system 1 includes a projector 10, an imaging apparatus 20, and an information processing apparatus 30. The projection system 1 shown in FIG. 1 is a system for projecting an image onto an article 40 having a three-dimensional shape. In the present embodiment, the article 40 is formed by cutting out a shape of a letter "E" from a plate-like member having a predetermined thickness. The article 40 has an adhesion surface (not shown) that is in contact with a wall surface 42, a surface 400 that is an opposite surface from the adhesion surface, and a side surface 402 that couples the adhesion surface and the surface 400. In the present embodiment, the surface 400 of the article 40 is set as a projection region of an image. The projection region of the image from the projector 10 corresponds to a mask region described below.

The projector 10 includes a liquid crystal light valve, a projection lens, and a liquid crystal driver that are used for projecting a projection image 56, 58 described below. The projector 10 includes, as a light source, an ultra-high pressure mercury lamp or a metal halide lamp. The projector is communicably coupled to the information processing apparatus 30 by, for example, a cable. The projector 10 acquires projection image data from the information processing apparatus 30 by communication via the cable. The projector 10 projects the projection image 56, 58 indicated by the acquired projection image data onto the mask region. Hereinafter, the mask region is a region where an input image 562, 582 described below is displayed, and regions other than the mask region are regions where the input image 562, 582 is not displayed, that is, regions that are not masked. In the present embodiment, the communication between the projector 10 and the information processing apparatus 30 is, for example, wired communication conforming to a standard such as Ethernet or Universal Serial Bus (USB). However, the communication between the projector 10 and the information processing apparatus 30 may also be wireless communication conforming to a standard such as Wi-Fi. Wi-Fi and Ethernet are registered trademarks.

Figure 3:
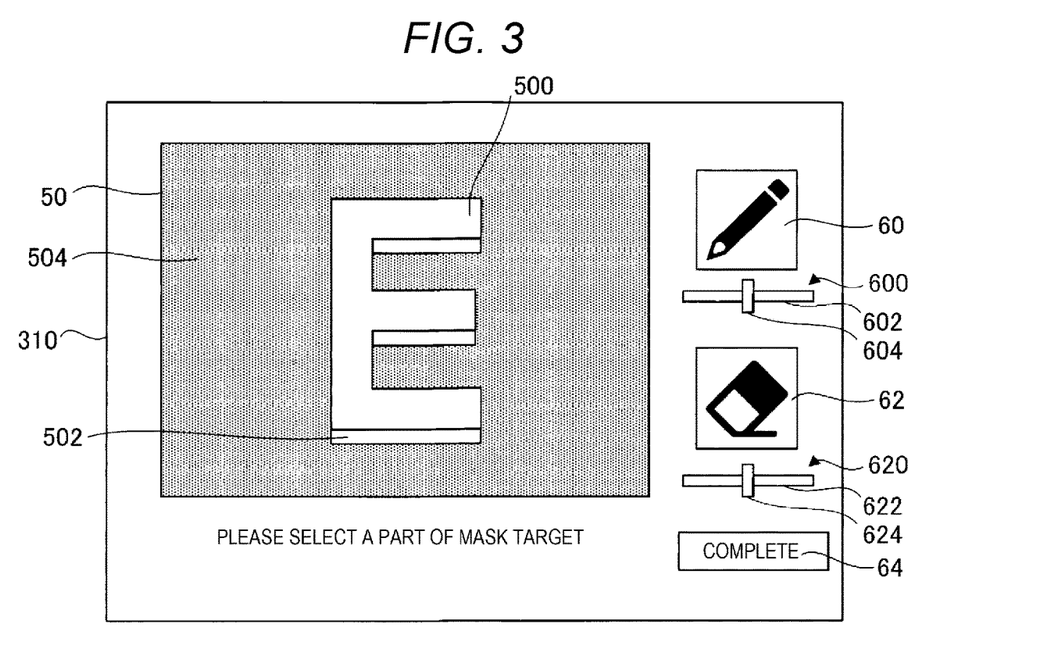
FIG. 3 is a diagram showing an example of a mode of receiving region selection by a region selection receiver.

The imaging apparatus 20 is, for example, a camera including a capturing element that converts condensed light into an electric signal, such as a charge coupled device (CCD), a complementary metal oxide semiconductor (CMOS), or the like. Hereinafter, in order to simplify a description, the imaging apparatus 20 is assumed to capture a still image. The imaging apparatus 20 may capture a video instead of capturing a still image. The imaging apparatus 20 captures an image of a capturing region 44 including the article 40. In the present embodiment, the capturing region 44 includes the article 40 and the wall surface 42. In the present embodiment, projection is not performed by the projector 10 when the imaging apparatus 20 captures the image. That is, a captured image 50 captured by the imaging apparatus 20 is an image obtained by capturing the capturing region 44 in a state where the projector 10 does not perform the projection. The captured image 50 is shown in FIG. 3 by example. The imaging apparatus 20 is communicably coupled to the information processing apparatus 30 by, for example, a cable in the same manner as the projector 10. The imaging apparatus 20 transmits captured image data representing the captured image to the information processing apparatus 30. In the present embodiment, the communication between the imaging apparatus 20 and the information processing apparatus 30 is, for example, wired communication conforming to a standard such as Ethernet or USB, and may be wireless communication conforming to a standard such as Wi-Fi. In the present embodiment, the imaging apparatus 20 is separate from the information processing apparatus 30 and the projector 10, but the imaging apparatus 20 may also be mounted on the information processing apparatus 30 or the projector 10.

The information processing apparatus 30 is an example of an electronic device, and is, for example, a personal computer. As shown in FIG. 1, the information processing apparatus 30 includes a communication device 300, a touch panel 310, a storage device 320, and a processing device 330. The projector 10 is coupled to the communication device 300 via a cable. The imaging apparatus 20 is coupled to the communication device 300 via a cable. The communication device 300 receives the captured image data transmitted from the imaging apparatus 20. The communication device 300 transmits the projection image data representing an image to be projected onto the article 40 to the projector 10 under control of the processing device 330.

The touch panel 310 is a device obtained by integrating a display device that displays various types of information and an input device that receives information input by a user. The input device is, for example, a transparent sheet-like contact sensor. The input device covers a display surface of the display device. The input device detects a touch position using a capacitance identified by the input device and an article in contact with the input device. The input device outputs data indicating the detected touch position to the processing device 330. Accordingly, an operation content of the user with respect to the touch panel 310 is transmitted to the processing device 330. Although the touch panel 310 is used as both the display device and the input device in the present embodiment, the display device and the input device may be provided separately. Specifically, for example, the information processing apparatus 30 may include a display as the display device, and include a keyboard and a mouse as the input device.

The storage device 320 is a recording medium readable by the processing device 330. The storage device 320 includes, for example, a nonvolatile memory and a volatile memory. The nonvolatile memory is, for example, a read only memory (ROM), an erasable programmable read only memory (EPROM), or an electrically erasable programmable read only memory (EEPROM). The volatile memory is, for example, a random access memory (RAM).

The nonvolatile memory of the storage device 320 stores a program 322 executed by the processing device 330 in advance. The volatile memory of the storage device 320 is used by the processing device 330 as a work area when the program 322 is executed. The program 322 may also be referred to as an "application program", an "application software", or an "app". The program 322 is, for example, acquired from a server or the like (not shown) via the communication device 300, and then is stored in the storage device 320.

The processing device 330 includes and is configured with, for example, a processor such as a central processing unit (CPU), that is, a computer. The processing device 330 may be configured with a single computer or may be configured by plural computers. The processing device 330 reads the program 322 from the nonvolatile memory to the volatile memory in response to the input device being operated to instruct a start of the execution of the program 322. The processing device 330 executes the program 322 read to the volatile memory.

Figure 2:
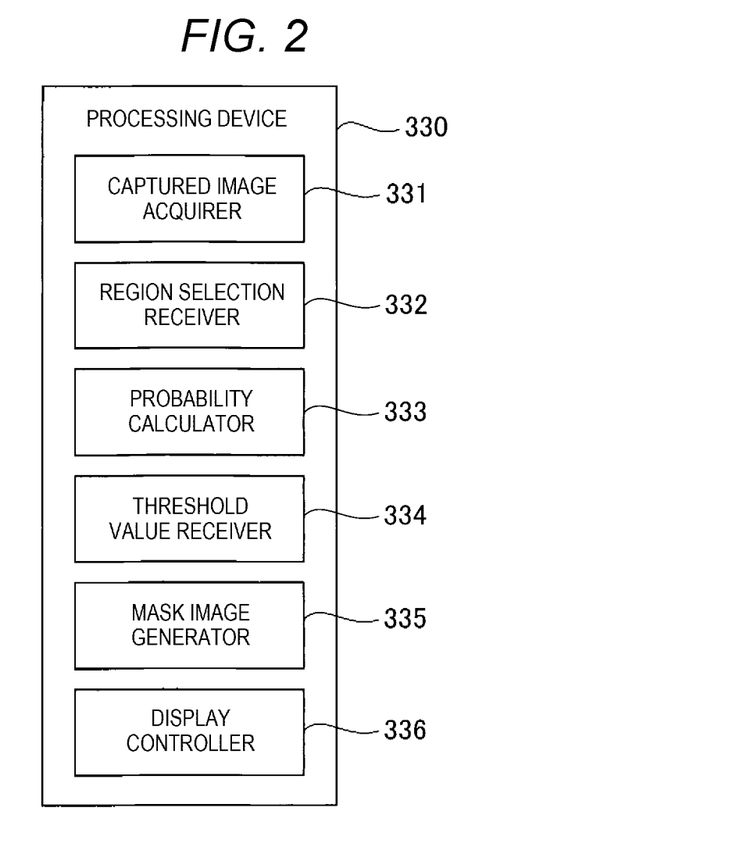
FIG. 2 is a block diagram showing a functional configuration of a processing device.

FIG. 2 is a block diagram showing a functional configuration of the processing device 330. The processing device 330 operating according to the program 322 functions as a captured image acquirer 331, a region selection receiver 332, a probability calculator 333, a threshold value receiver 334, a mask image generator 335, and a display controller 336 that are shown in FIG. 2. The captured image acquirer 331, the region selection receiver 332, the probability calculator 333, the threshold value receiver 334, the mask image generator 335, and the display controller 336 that are shown in FIG. 2 are software modules realized by causing the processing device 330 to operate according to the program 322.

The captured image acquirer 331 acquires, from the imaging apparatus 20, the captured image 50 obtained by capturing the capturing region 44 including the article 40. The captured image 50 corresponds to the first image. In the present embodiment, the captured image acquirer 331 receives the captured image data from the imaging apparatus 20 via the communication device 300. The captured image 50 may be the image captured by the imaging apparatus 20 per se, or may be an image obtained by using a structured light projection method or the like to perform coordinate conversion on the image captured by the imaging apparatus 20 into an image captured from a point of sight of the projector 10.

The region selection receiver 332 causes the touch panel 310 to display the captured image 50 acquired by the captured image acquirer 331, and receives an input of information of selecting the mask region using the captured image 50. In the present embodiment, the region selection receiver 332 receives drawing input with respect to the captured image 50 from the user. The drawing input indicates a part of the mask region or a part of the non-mask region on the captured image 50.

Figure 4:
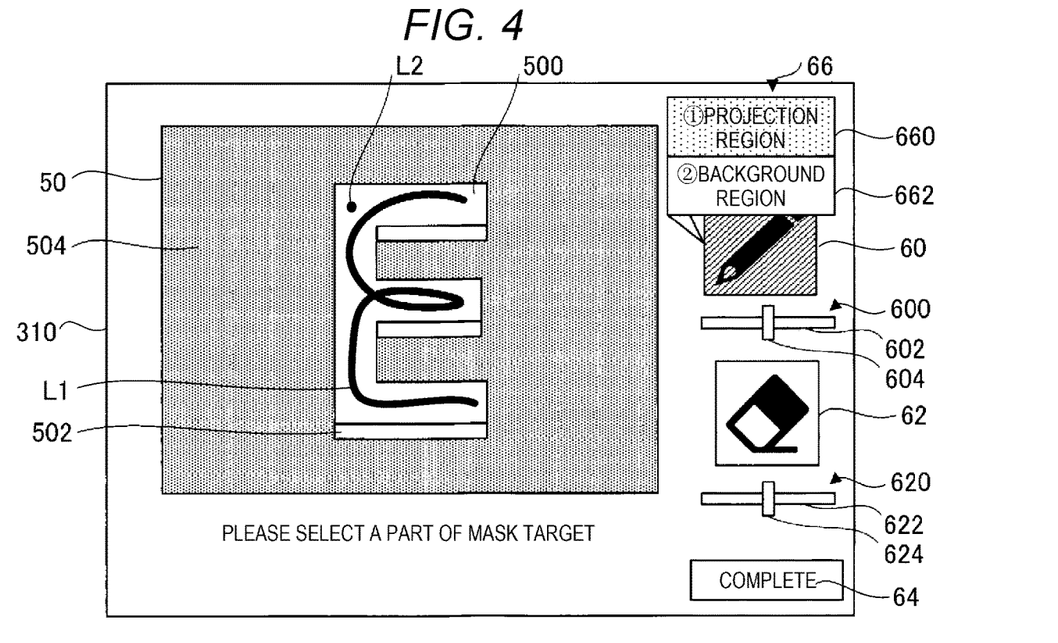
FIG. 4 is a diagram showing an example of a mode of receiving the region selection by the region selection receiver.

FIGS. 3 and 4 are diagrams showing examples of modes of receiving the region selection by the region selection receiver 332. In FIG. 3, the captured image 50 is displayed on the touch panel 310. The captured image 50 is an image obtained by capturing the capturing region 44 including the article 40 shown in FIG. 1, and includes a first region 500 corresponding to the surface 400 of the article 40, a second region 502 corresponding to the side surface 402 of the article 40, and a third region 504 corresponding to the wall surface 42.

The touch panel 310 displays a drawing button 60, a cancel button 62, and a completion button 64, together with the captured image 50. When the user touches the drawing button 60, the region selection receiver 332 displays a region type specifier 66 for specifying whether to specify the mask region or the non-mask region in the current drawing, as shown in FIG. 4. The region type specifier 66 includes a mask region specifier 660 and a non-mask region specifier 662 as selection items. The user selects the mask region specifier 660 when the mask region is to be specified, and selects the non-mask region specifier 662 when the non-mask region is to be specified. In FIG. 4, the mask region specifier 660 is selected. When the user touches the captured image 50 in this state, the region selection receiver 332 displays a trajectory of the touch as though the trajectory were drawn with a pen. The region selection receiver 332 receives information of any pixel specified by the drawing input, such that a pixel whose trajectory is displayed is regarded as a pixel included in the mask region in the captured image 50. Similarly, when the user touches the captured image 50 in a state where the non-mask region specifier 662 is selected, the region selection receiver 332 displays the trajectory of the user as though the trajectory were drawn with a pen. In this case, the region selection receiver 332 receives information of a pixel whose trajectory is displayed as a pixel included in the non-mask region in the captured image 50.

In the present embodiment, since the surface 400 of the article 40 is set as the mask region, the user draws a trajectory with respect to the first region 500 of the captured image 50 when the mask region specifier 660 is selected. At this time, for example, the user may draw a trajectory along the entire first region 500 according to a trajectory L1, or may draw a trajectory by touching only one point or plural points of the first region 500 according to a trajectory L2. Drawing of a line such as the trajectory L1 and drawing of a point such as the trajectory L2 may be combined. When the user selects the non-mask region, the user selects the non-mask region specifier 662 by the region type specifier 66 and draws a trajectory with respect to at least one of the second region 502 and the third region 504 of the captured image 50. The user may specify at least one pixel of the captured image 50 and specify whether the pixel is included in the mask region or the non-mask region.

The user may be allowed to specify both the mask region specifier 660 and the non-mask region specifier 662 by drawing a trajectory to specify the mask region specifier 660 and then further drawing a trajectory to specify the non-mask region specifier 662. At this time, by using different colors as a color of the trajectory when the mask region specifier 660 is selected and a color of the trajectory when the non-mask region specifier 662 is selected, the user can easily recognize a region type of a portion selected by the user per se, which improves the operability.

The cancel button 62 is used to cancel the drawing input. For example, when the user wants to cancel the drawing, such as when the trajectory protrudes out of the first region 500, the user touches the cancel button 62 and traces a portion to be canceled of the trajectory. Then, the region selection receiver 332 deletes the trajectory of the portion, and cancels the specification of corresponding pixels as the mask region or the non-mask region. When the traced portion is the whole of the drawing input, the whole of the drawing input is canceled, and when the traced portion is a part of the drawing input, the part of the drawing input is canceled.

A slider bar 600 is displayed below the drawing button 60. The slider bar 600 is an interface for adjusting a thickness of the trajectory when the drawing button 60 is touched to perform drawing. The slider bar 600 includes a bar 602 extending in a predetermined direction and a slider 604 movable on the bar 602. In an example of FIG. 4, the bar 602 extends in a left-right direction of a screen of the touch panel 310. A center position of the bar 602 in the left-right direction is a reference position of the slider 604, and a width of the trajectory at this time is set as a reference width. When the user moves the slider 604 to a right side of the reference position, the region selection receiver 332 makes the width of the trajectory larger than the reference width. Accordingly, the number of pixels specified as the mask region or the non-mask region increases by performing the same drawing operation as a drawing operation performed when the slider 604 is located on the reference position. When the user moves the slider 604 to a left side of the reference position, the region selection receiver 332 makes the width of the trajectory smaller than the reference width. Accordingly, the number of pixels specified as the mask region or the non-mask region decreases by performing the same drawing operation as a drawing operation performed when the slider 604 is located on the reference position.

Similarly, a slider bar 620 is displayed below the cancel button 62. The slider bar 620 is an interface for adjusting a width of a cancellation region when the cancel button 62 is touched to cancel the drawing. The slider bar 620 includes a bar 622 extending in a predetermined direction and a slider 624 movable on the bar 622. In the example of FIG. 4, the bar 622 extends in the left-right direction of the screen of the touch panel 310. A center position of the bar 622 in the left-right direction is a reference position of the slider 624, and the width of the cancellation region at this time is set as a reference width. When the user moves the slider 624 to a right side of the reference position, the region selection receiver 332 makes the width of the cancellation region larger than the reference width. Accordingly, the number of pixels of the trajectory to be canceled increases by performing the same canceling operation as a canceling operation performed when the slider 624 is located on the reference position. When the user moves the slider 624 to a left side of the reference position, the region selection receiver 332 makes the width of the cancellation region smaller than the reference width. Accordingly, the number of pixels of the trajectory to be canceled decreases by performing the same drawing operation as the drawing operation performed when the slider 604 is located on the reference position.

When the user ends the drawing on the mask region or the non-mask region, the user presses the completion button 64. The region selection receiver 332 receives pixels selected as the mask region or the non-mask region by the user based on a drawing content at the time when the completion button 64 is pressed.

That is, the region selection receiver 332 displays the captured image 50, and receives, by using the captured image 50, the input of information of selecting the mask region. Receiving the input of the information of selecting the mask region by the region selection receiver 332 includes specifying any pixel of the captured image 50 as a pixel constituting the mask region or as a pixel constituting the non-mask region. In addition, receiving the input of the information of selecting the mask region by the region selection receiver 332 includes receiving the drawing input with respect to the captured image 50. Further, receiving the input of the information of selecting the mask region by the region selection receiver 332 includes canceling at least a part of the drawing input using the cancel button 62.

In the present embodiment, the region selection receiver 332 receives the selection of the mask region or the non-mask region by receiving the drawing with respect to the mask region or the non-mask region, but a selection method is not limited to the above. For example, the user may use a captured image 50 in which each pixel is numbered to specify a pixel number of a pixel included in the mask region or a pixel number of a pixel included in the non-mask region. The numbering may be performed on all or some of the pixels.

The probability calculator 333 shown in FIG. 2 calculates a probability of each pixel of the captured image 50 being a pixel constituting the mask region. Examples of a method for calculating a probability of any pixel on the image being included in a certain region include various methods such as a grow-cut algorism. For example, a probability of each pixel selected as the mask region by the region selection receiver 332 being in the mask region is set to 100%. A probability of other pixels being in the mask region is calculated based on similarity with the pixels selected as the mask region. The similarity between the pixels can be calculated using parameters such as a color and a depth of the pixels and a distance from the pixel selected as the mask region. Hereinafter, the pixel selected as the mask region is referred to as a "mask region pixel", and the pixel for which the probability is calculated is referred to as a "target pixel".

For example, when the probability is calculated using the color, a probability P1 of the target pixel being a mask region pixel can be calculated according to the following Equation (1) by using an RGB value [Rx, Gx, Bx] of the target pixel and an RGB value [R0, G0, B0] of the mask region pixel. P1 takes a value from 0 to 1, and a larger the value indicates a higher probability of the target pixel being a mask region pixel. A denominator "255" in the following Equation (1) is a value in a case where a gradation is expressed by 8 bits, that is, each value of Rx, Gx, Bx, R0, G0, and B0 is expressed by an integer from 0 to 255. In a case where the gradation is not 8 bits, a value corresponding to "255" in the following Equation (1) is a value obtained by subtracting 1 from the number of gradations.

$$P1 = 1 - \frac{c1}{\sqrt{255^2 + 255^2 + 255^2}} \text{ where} \quad (1)$$

$$c1 = \sqrt{(Rx - R0)^2 + (Gx - G0)^2 + (Bx - B0)^2}$$

For example, when the probability is calculated using the distance, a probability P2 of the target pixel being a mask region pixel can be calculated according to the following Equation (2) by using a distance [Dx] of the target pixel and a distance [D0] of the mask region pixel. P2 takes a value from 0 to 1, and a larger the value indicates a higher probability of the target pixel being a mask region pixel. In the following Equation (2), the distances Dx and D0 are scaled to values from 0 to 255 in order to match a scale of above Equation (1).

$$P2 = 1 - \frac{c2}{\sqrt{255^2}} \text{ where} \quad (2)$$

$$c2 = \sqrt{(Dx - D0)^2}$$

For example, when the probability is calculated using both the color and the distance, a probability P3 of the target pixel being a mask region pixel can be calculated according to the following Equation (3) by using the RGB value [Rx, Gx, Bx] of the target pixel, the RGB value [R0, G0, B0] of the mask region pixel, the distance [Dx] of the target pixel, and the distance [D0] of the mask region pixel. P3 takes a value from 0 to 1, and a larger the value indicates a higher probability of the target pixel being a mask region pixel. In the following Equation (3), the gradation of the color is expressed by 8 bits, that is, an integer from 0 to 255. In addition, distances between the pixels are also scaled from 0 to 255. In the equation, $\alpha$ is a weight of the color and $\beta$ is a weight of the distances, which can be set to any value depending on the parameter to be emphasized. The weights a and $\beta$ may be not set. That is, $\alpha$ and $\beta$ may be set to 1.

$$P3 = 1 - \frac{c3}{\alpha\sqrt{255^2 + 255^2 + 255^2} + \beta\sqrt{255^2}} \text{ where} \quad (3)$$

$$c3 = \alpha\sqrt{(Rx - R0)^2 + (Gx - G0)^2 + (Bx - B0)^2} + \beta\sqrt{(Dx - D0)^2}$$

When the depth or the like is used, the probability of the target image being a mask region pixel can be obtained by the same method. In the case of obtaining the probability using plural parameters, for example, as shown in the above Equation (3), the probability obtained using each parameter may be weighted and added up. In a case where plural mask region pixels are selected, for example, the probability calculator 333 may calculate the probability using an average value of values of the parameters for probability calculation in all the mask region pixels, or may calculate the probability using values of the parameters of a mask region pixel closest to the target pixel.

The probability calculator 333 may calculate, by using a coordinate conversion table of the imaging apparatus 20 and the projector 10, the probability of each pixel of the captured image 50 being a pixel constituting the mask region. In a coordinate conversion table obtained by the structured light projection method, a value continuously changes when adjacent coordinates are on the same plane, whereas a value discontinuously changes when adjacent coordinates change in a height direction. By using the coordinate conversion table, the probability calculator 333 can estimate a position of a boundary portion between a plane and a three-dimensional article. In the present embodiment, the probability calculator 333 can calculate a probability of each pixel of the captured image 50 being the surface 400 by estimating a position of a boundary between the article 40 and the wall surface 42 and a position of a boundary between the surface 400 and the side surface 402 of the article 40.

When the non-mask region is selected by the region selection receiver 332, the probability calculator 333 may calculate a probability of the target image being a pixel constituting the non-mask region.

Figure 5:
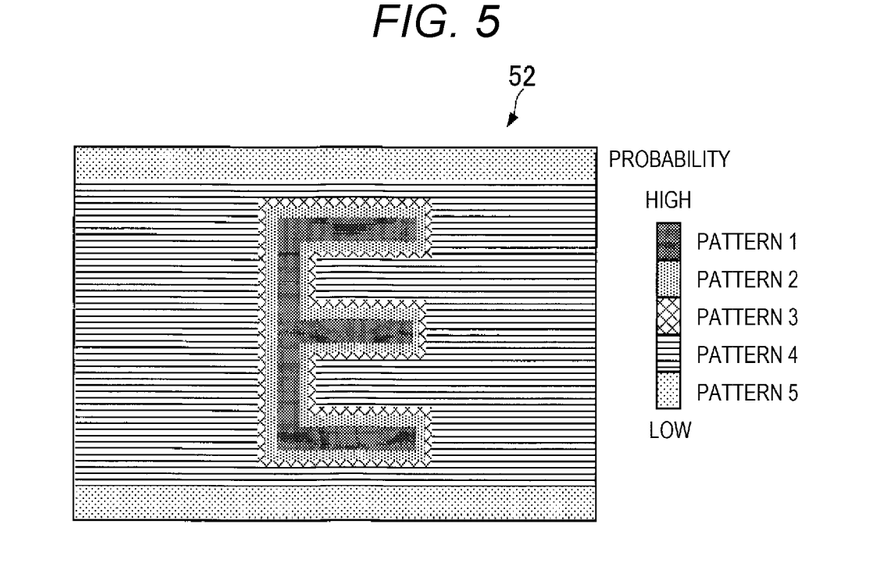
FIG. 5 is a diagram showing an example of a probability distribution image generated by a probability calculator.

FIG. 5 is a diagram showing an example of a probability distribution image 52 generated by the probability calculator 333. In FIG. 5, the probability of each pixel being in the mask region is classified by five types of shading. Here, $\alpha 1$ to $\alpha 4$ are positive numbers of 1 or less and larger than 0, and $\alpha 1 > \alpha 2 > \alpha 3 > \alpha 4$. Shaded pattern 1 is, for example, a region having a probability of being in the mask region of α1 or more. Shaded pattern 2 is, for example, a region having a probability of being in the mask region of less than α1 and α2 or more. Shaded pattern 3 is, for example, a region having a probability of being in the mask region of less than α2 and α3 or more. Shaded pattern 4 is, for example, a region having a probability of being in the mask region of less than α3 and α4 or more. Shaded pattern 5 is, for example, a region having a probability of being in the mask region of less than α4.

The probability calculator 333 may calculate the probability of each pixel of the captured image 50 being in the mask region or the probability of each pixel of the captured image 50 being in the non-mask region, and the probability distribution image 52 as shown in FIG. 5 may not necessarily be generated. Information indicating the probability of each pixel of the captured image 50 being in the mask region or the probability of each pixel of the captured image 50 being in the non-mask region is referred to as probability distribution information. In the present embodiment, the information processing apparatus 30 generates the probability distribution information, but is not limited thereto. For example, the information processing apparatus 30 may acquire probability distribution information generated by another information processing apparatus through communication or the like. For example, the storage device 320 may store probability distribution information generated by the probability calculator 333 in the past, and the processing device 330 may read the probability distribution information.

The threshold value receiver 334 shown in FIG. 2 receives the input of the threshold value from the user. The threshold value is a value used when the mask image generator 335 described below determines whether each pixel of the captured image 50 is a pixel constituting the mask region. More specifically, the threshold value is a value indicating the probability of each pixel of the captured image 50 being a pixel constituting the mask region. The mask image generator 335 described below regards pixels that each have a probability of being in the mask region of no less than the threshold value received by the threshold value receiver 334 as pixels constituting the mask region, and uses such pixels to generate a mask image 560, 580.

Figure 6:
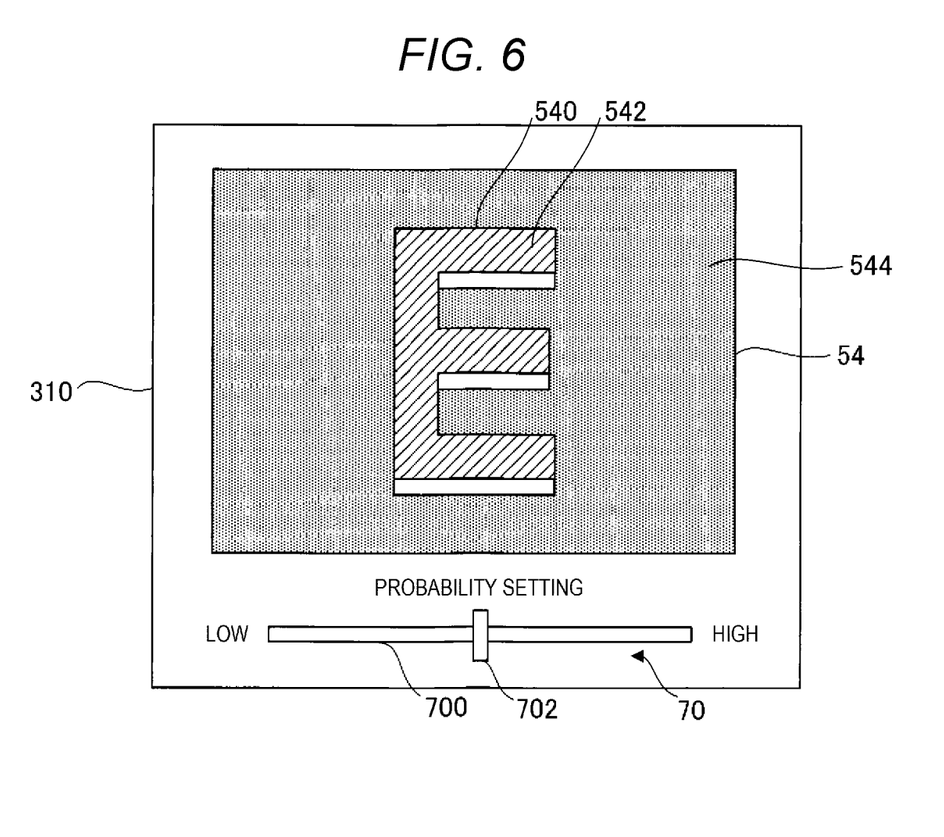
FIG. 6 is a diagram showing an example of a mode of receiving an input of a threshold value by a threshold value receiver.

FIG. 6 is a diagram showing an example of a mode of receiving an input of the threshold value by the threshold value receiver 334. In the present embodiment, the display controller 336 described below causes the touch panel 310 to display a temporary projection image 54 including a temporary mask image 540, and causes the touch panel 310 to display a slider bar 70 that is a user interface for receiving the input of the threshold value. The threshold value receiver 334 receives an operation on the slider bar 70 as the input of the threshold value.

First, the temporary projection image 54 will be described. In the present embodiment, the temporary projection image 54 includes the temporary mask image 540, an input image 542, and a background image 544. The temporary mask image 540 is generated by the mask image generator 335 described below. The temporary mask image 540 is an image regarding the pixels each having a probability of being in the mask region of no less than a predetermined temporary threshold value in the probability distribution image 52 shown in FIG. 5 as the mask region. In FIG. 6, the temporary threshold value is set as α2. That is, in the temporary mask image 540 shown in FIG. 6, pixels each having a probability of being in the mask region of α2 or more in the probability distribution image 52 shown in FIG. 5, that is, regions indicated by pattern 1 and pattern 2, are set as a mask region. The temporary threshold value may be a fixed value set in advance in the program 322, or may be a value specified by the user. The temporary mask image 540 is constructed by a line indicating edges of the mask region. The region surrounded by the line is the mask region. The input image 542 is an image projected in the mask region. The input image 542 may be an image input from outside to the processing device 330, or an input image 542 having a single color may be generated inside the processing device 330. The background image 544 is an image used as a background of the temporary mask image 540, and uses an image including the article 40 captured by the capturing device 20, that is, the captured image 50 in an example of FIG. 6. By superimposing the temporary mask image 540 and the input image 542 on the background image 544 using such a captured image 50, the user can understand in more detail an image obtained when a projection is actually performed by the projector 10. The background image 544 can also be said to be an image showing a state in which the input image 542 is not displayed outside the mask region.

In addition to causing the touch panel 310 of the information processing apparatus 30 to display the temporary projection image 54 as shown in FIG. 6, the display controller 336 may cause the projector 10 to actually project the temporary projection image 54 onto the article 40, for example. By actually projecting the temporary projection image 54 onto the article 40, for example, the user can understand, more accurately and in more detail, a positional relation, a balance of color, and the like between the article 40 and the mask region. In the case where the temporary projection image 54 is projected onto the article 40 by the projector 10, the temporary projection image 54 is generally regarded as including the temporary mask image 540 and the input image 542, but may further include the background image 544.

Next, the slider bar 70 will be described. The slider bar 70 includes a bar 700 extending in a predetermined direction and a slider 702 movable on the bar 700. In the example of FIG. 6, the bar 700 extends in the left-right direction of the screen of the touch panel 310. A center position of the bar 700 in the left-right direction is a reference position of the slider 702. When the user moves the slider 702 to a right side of the reference position, the threshold value receiver 334 receives a value specified as the threshold value that is larger than the temporary threshold value. In this case, the user instructs to set the mask region focusing on pixels each having a probability of being in the mask region higher than the temporary threshold value. When the user moves the slider 702 to a left side of the reference position, the threshold value receiver 334 receives a value specified as the threshold value that is smaller than the temporary threshold value. In this case, the user instructs to set the mask region also including pixels each having a probability of being in the mask region lower than the temporary threshold value.

When the temporary projection image 54 is actually projected onto the article 40 by the projector 10, for example, the slider bar 70 may be displayed alone on the touch panel 310. Alternatively, an image obtained by the imaging apparatus 20 capturing the article 40, onto which the temporary projection image 54 is projected by the projector 10, may be displayed together with the slider bar 70. Alternatively, screen display as shown in FIG. 6 may be performed simultaneously with the projection performed by the projector 10.

Figure 7:
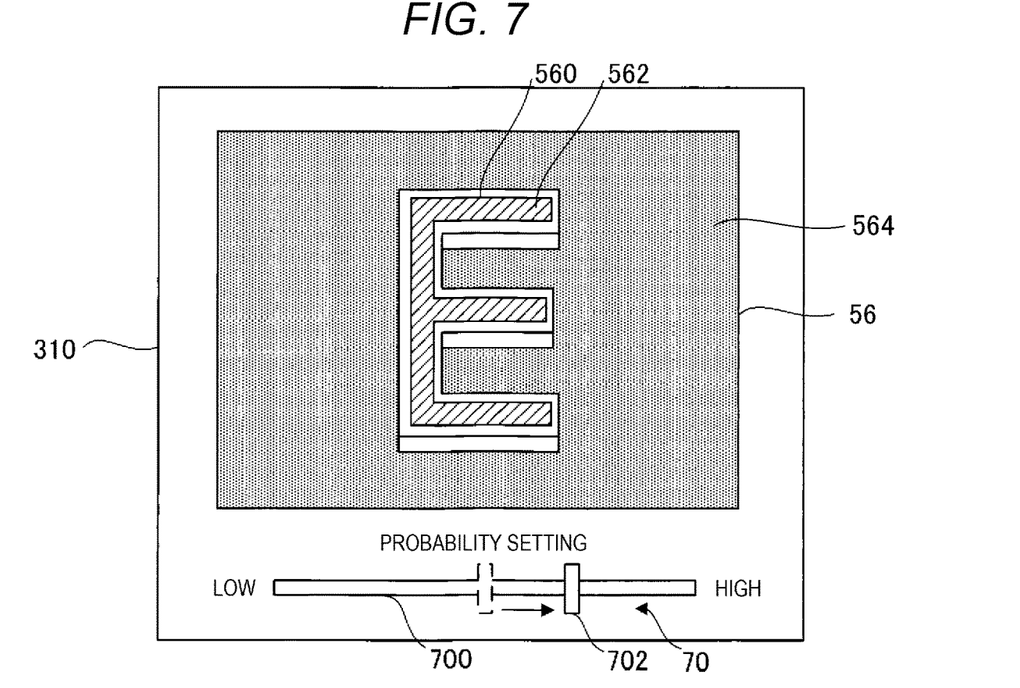
FIG. 7 shows an example of a mode of displaying a projection image by a display controller.
Figure 8:
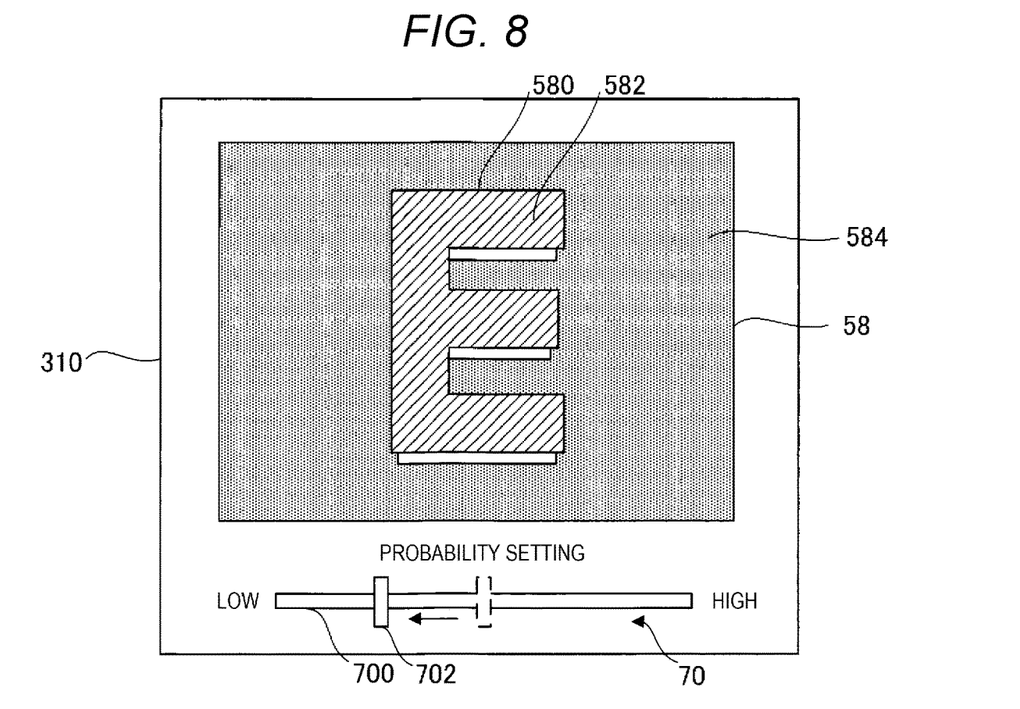
FIG. 8 shows an example of a mode of displaying the projection image by the display controller.

The mask image generator 335 shown in FIG. 2 generates the mask image 560, 580 for identifying a projection region of an image from the projector 10, that is, the mask region. The mask image 560, 580 is shown in FIGS. 7 and 8 by example. More specifically, the mask image generator 335 generates, by using the threshold value input to the threshold value receiver 334, the mask image 560, 580 showing the mask region of the captured image 50, which is a region where the input image 542 is displayed, or the non-mask region of the captured image 50, which is a region where the input image 542 is not displayed. The mask image 560, 580 corresponds to the second image. The mask region can also be said to be a region of the captured image 50 corresponding to a projection region of the capturing region 44. The mask image generator 335 described above generates the mask image 560, 580 such that a pixel that has a probability of being in the mask region of no less than the threshold value received by the threshold value receiver 334 in the probability distribution image 52 generated by the probability calculator 333 is regarded as a pixel constituting the mask region. The mask image 560, 580 generated by the mask image generator 335 changes every time a change in the threshold value is input to the threshold value receiver 334.

The display controller 336 displays the projection image 56, 58 obtained by superimposing the mask image 560, 580 on the input image 562, 582.

FIGS. 7 and 8 are diagrams showing examples of a mode of displaying the projection image 56, 58 by the display controller 336. FIG. 7 is a display example in a case where an operation for increasing the threshold value is input to the temporary projection image 54 shown in FIG. 6, that is, in a case where the slider 702 is moved to the right side of the reference position. The slider 702 in FIGS. 7 and 8 is displayed at a position corresponding to the threshold value set in the displayed mask image 560, 580. In FIG. 7, the threshold value is specified as α1 by an operation of the slider bar 70. In FIG. 7, the projection image 56 includes the mask image 560, the input image 562, and the background image 564, which is the captured image 50 including the article 40, and is displayed on the touch panel 310. In the mask image 560, pixels each having a probability of being in the mask region of α1 or more in the probability distribution image 52, that is, the region indicated by pattern 1 shown in FIG. 5, is the mask region. That is, the mask image 560 has an area smaller than an area of the temporary mask image 540 in the temporary projection image 54 shown in FIG. 6.

FIG. 8 is a display example in a case where an operation for decreasing the threshold value is input to the temporary projection image 54 shown in FIG. 6, that is, in a case where the slider 702 is moved to the left side of the reference position. In FIG. 8, the threshold value is specified as α3 by an operation of the slider bar 70. In FIG. 8, the projection image 58 includes the mask image 580, the input image 582, and the background image 584, which is the captured image 50 including the article 40, and is displayed on the touch panel 310. In the mask image 580 in FIG. 8, pixels each having a probability of being in the mask region of α3 or more in the probability distribution image 52 shown in FIG. 5, that is, a region indicated by patterns 1 to 3, is the mask region. That is, the mask image 580 has an area larger than the area of the temporary mask image 540 in the temporary projection image 54 shown in FIG. 6.

In addition to causing the touch panel 310 of the information processing apparatus 30 to display the projection image 56, 58 as shown in FIGS. 7 and 8, the display controller 336 may cause the projector 10 to actually project the projection image 56, 58 onto the article 40, for example. By actually projecting the projection image 56, 58 onto the article 40, for example, the user can understand, more accurately and in more detail, a positional relation, a balance of color, and the like between the article 40 and the mask region after the threshold value is adjusted. In the case where the projection image 56, 58 is projected onto the article 40 by the projector 10, the projection image 56, 58 is generally regarded as including the mask image 560, 580 and the input image 562, 582, but may further include the background image 564, 584.

In FIGS. 7 and 8, the slider bar 70 for receiving the input of the threshold value from the user is displayed on the touch panel 310. The slider bar 70 has a configuration and a function the same as those described with reference to FIG. 6. When the user performs an operation on the slider bar 70 during displaying the projection image 56, 58 including the mask image 560, 580, the mask image generator 335 changes pixels included in the mask region according to an operation amount of the slider bar 70. Next, the display controller 336 causes the touch panel 310 to display the projection image 56, 58 including the changed mask image 560, 580.

Figure 9:
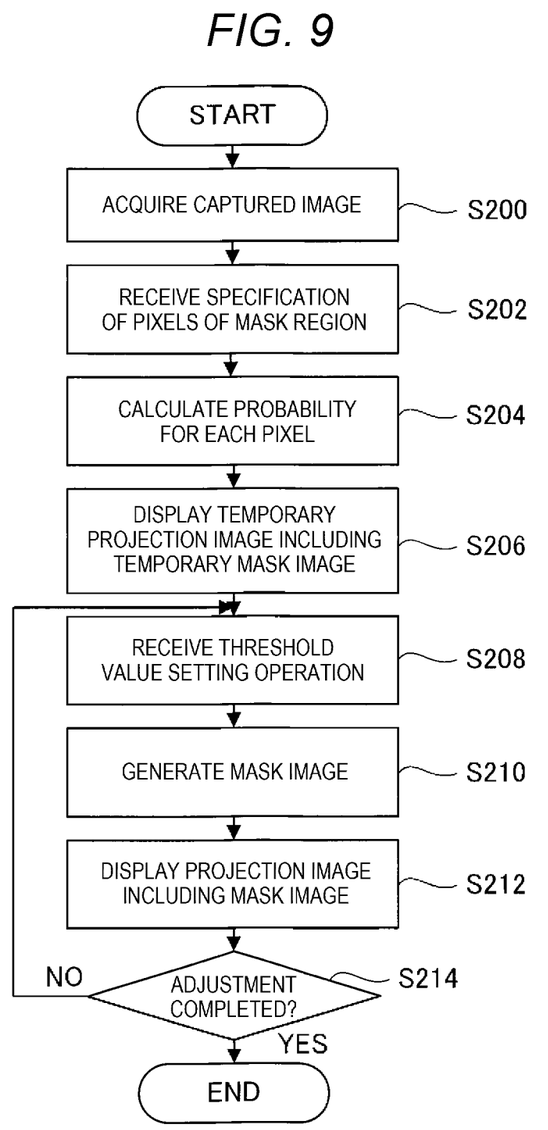
FIG. 9 is a flowchart showing a flow of displaying method executed by a processing device of an information processing apparatus according to a program.

FIG. 9 is a flowchart showing a flow of a displaying method executed by the processing device 330 of the information processing apparatus 30 according to the program 322. In FIG. 9, a display target of the projection image 56, 58 is the touch panel 310. The processing device 330 functions as the captured image acquirer 331 and acquires, from the imaging apparatus 20, the captured image 50 obtained by capturing a region including the article 40 (step S200).

The processing device 330 functions as the region selection receiver 332 and receives specification of pixels constituting the mask region from the user (step S202). That is, the processing device 330 causes the touch panel 310 to display the captured image 50 acquired in step S200, and receives the drawing input with respect to the captured image 50 from the user. The user draws by touching a portion of the captured image 50 corresponding to the mask region. In step S202, the processing device 330 may also receive specification of pixels constituting the non-mask region.

The processing device 330 functions as the probability calculator 333 and calculates the probability of each pixel of the captured image 50 being in the mask region (step S204). At this time, the processing device 330 calculates the probability based on, for example, a similarity between each pixel of the captured image 50 and the pixels constituting the mask region specified in step S202.

The processing device 330 functions as the display controller 336 and causes the touch panel 310 to display the temporary projection image 54 including the temporary mask image 540 (step S206). The temporary mask image 540 is an image regarding pixels each having a probability calculated in step S204 of no less than a predetermined temporary threshold value as the mask region. As shown in FIG. 6, the processing device 330 causes the touch panel 310 to display the slider bar 70 for adjusting the threshold value, together with the temporary projection image 54.

The processing device 330 functions as the threshold value receiver 334 and receives a threshold value setting operation from the user (step S208). As described above, the threshold value is a value used for determining pixels to be included in the mask region. The processing device 330 receives an operation with respect to the slider bar 70 as the input of the threshold value.

The processing device 330 functions as the mask image generator 335 and generates the mask image 560, 580 based on the threshold value set in step S208 (step S210). That is, the processing device 330 generates the mask image 560, 580 regarding pixels each having a probability of being in the mask region of no less than the threshold value calculated in step S208 as the mask region.

The processing device 330 functions as the display controller 336 and causes the touch panel 310 to display the projection image 56, 58 including the mask image 560, 580 generated in step S210 (step S212). At this time, the processing device 330 displays the slider bar 70 used for resetting the threshold value together with the projection image 56, 58.

The user views the projection image 56, 58 displayed on the touch panel 310, and determines whether the image projected onto the article 40 is as imagined or needs to be further adjusted. For example, the processing device 330 may display a button for receiving an input of whether to complete the adjustment on the touch panel 310 in step S208 or step S212, and determine whether to complete the adjustment based on an operation of the user (step S214). As an example of the display, at least a button to be selected in the case of completion is displayed. In a case where the adjustment is to be continued, a button to be selected in the case to continue the adjustment may be displayed, or it may be determined to continue the adjustment when the slider bar 70 is operated, without displaying the button. The processing device 330 returns to step S208 and repeats the subsequent processes until the adjustment performed by the user is completed (step S214: NO). When it is determined that the button instructing the completion is pressed and the adjustment performed by the user is completed (step S214: YES), the processing device 330 ends the process of the flowchart.

As described above, the processing device 330 of the information processing apparatus 30 according to the embodiment executes the program 322 to function as the captured image acquirer 331, the region selection receiver 332, the probability calculator 333, the threshold value receiver 334, the mask image generator 335, and the display controller 336. The threshold value receiver 334 receives the input of the threshold value. The mask image generator 335 generates, by using the threshold value, the mask image 560, 580 showing the mask region of the captured image 50, which is a region where the input image 562, 582 is displayed, or the non-mask region of the captured image 50, which is a region where the input image 562, 582 is not displayed. The display controller 336 displays the projection image 56, 58 obtained by superimposing the mask image 560, 580 on the input image 562, 582. Since the mask image 560, 580 is generated based on the input threshold value, the number of the mask images 560, 580 that can be generated is larger than that in a case where the threshold value is a fixed value. Therefore, the user can easily adjust the mask region in accordance with the sensitivity of the user.

The threshold value is a value used to determine whether each pixel of the captured image 50 is a pixel constituting the mask region. Therefore, the user can easily set a range of pixels included in the mask region.

The threshold value is a value indicating the probability of each pixel of the captured image 50 being a pixel constituting the mask region. Therefore, the user can set the range of pixels included in the mask region based on the probability of each pixel being a pixel constituting the mask region.

The mask region is either a predetermined portion of the mask image 560, 580 corresponding to the article 40 reflected in the captured image 50 or a portion of the mask image 560, 580 other than the predetermined portion.

Accordingly, the processing device 330 can accurately select the mask region and other regions. The user can easily set the mask region in accordance with a shape of the article 40.

The region selection receiver 332 displays the captured image 50 and receives, using the captured image 50, the input of the information of selecting the mask region. When the mask image generator 335 generates the mask image 560, 580, the mask image generator 335 extracts the mask region based on the threshold value and the information of selecting the mask region. Accordingly, the user can directly specify, on the captured image 50, a region to be included in the mask region, and can generate a mask image 560, 580 that reflects an intention of the user more accurately.

Receiving the input of the information of selecting the mask region by the region selection receiver 332 includes receiving the drawing input with respect to the captured image 50. The information of selecting the mask region includes information of the pixels specified by the drawing input. Accordingly, the user can easily and intuitively specify a portion to be included in the mask region in the captured image 50, and the convenience of the user can be improved.

Receiving the input of the information of selecting the mask region by the region selection receiver 332 includes canceling at least a part of the drawing input. Accordingly, the user can easily cancel the drawing input even if the drawing input is incorrect, and the convenience when the user performs the drawing input can be improved.

Receiving the input of the information of selecting the mask region by the region selection receiver 332 includes specifying any pixel of the captured image 50 as a pixel constituting the mask region or any pixel of the captured image 50 as a pixel constituting the non-mask region. Accordingly, even if pixels of not only the mask region but also of the non-mask region are specified, the mask image 560, 580 can be generated, and the convenience of the user can be improved.

2. Modification

The embodiments described above may be modified in various ways. Aspects of a specific modification that can be applied to the embodiments described above will be described below. Two or more aspects optionally selected from the following examples can be appropriately combined within a range that the aspects do not contradict each other.

In the present embodiment, the processing device 330 displays the slider bar 70 as an interface that receives the specification of the threshold value from the user, but the interface is not limited to the slider bar 70. For example, the interface may be two buttons, one associated with increase in the threshold value and the other associated with decrease in the threshold. In this case, the processing device 330 increases the predetermined threshold value each time the user presses the button associated with the increase in the threshold value. The processing device 330 decreases the predetermined threshold value each time the user presses the button associated with the decrease in the threshold value. The two buttons may be marked with marks indicating opposite directions, such as triangles, or may be shaped in a manner indicating opposite directions. Accordingly, it is easy for the user to intuitively operate the processing device 330. In addition, for example, the interface may allow the user to input a numerical value. In this case, the user inputs, for example, a numerical value specifying the threshold value. In addition, for example, an interface receiving specification of the threshold value by voice input may be provided.

In the present embodiment, in order to set the surface 400 of the article 40 as the mask region, a mask region is set by extracting, from the captured image 50 captured by the capturing apparatus 20, a portion having a probability of corresponding to the surface 400 of no less than the threshold value. That is, the mask region is a predetermined portion identified by the article 40 reflected in the captured image 50. However, for example, a region other than the predetermined portion identified by the article 40 reflected in the captured image 50, for example, the wall surface 42 to which the article 40 is attached may be specified as the mask region. In this case, the user may select the mask region specifier 660 of the region type specifier 66 shown in FIG. 4 to perform drawing on a portion of the captured image 50 corresponding to the wall surface 42, or may select the non-mask region specifier 662 to perform the drawing on a portion of the captured image 50 corresponding to the surface 400.

What is claimed is:

1. A displaying method, comprising:
    displaying an interface for receiving an input of a threshold value from a user;
    generating, by using the threshold value, a second image showing a mask region of a first image that is a region where an input image is to be displayed on an article or a non-mask region of the first image that is a region where the input image is not displayed on the article, the mask region being set in accordance with a shape of the article; and
    displaying a projection image obtained by superimposing the second image on the input image.

2. The displaying method according to claim 1, wherein the threshold value is a value used for determining whether each pixel of the first image is a pixel constituting the mask region.

3. The displaying method according to claim 2, wherein the threshold value is a value indicating a probability of each pixel of the first image being a pixel constituting the mask region.

4. The displaying method according to claim 1, wherein the mask region is either a predetermined portion of the second image corresponding to the article reflected in the first image or a portion of the second image other than the predetermined portion.

5. The displaying method according to claim 1, further comprising:
    displaying the first image; and
    receiving, by using the first image, an input of information of selecting the mask region, wherein
    generating the second image includes:
        extracting the mask region based on the threshold value and the information of selecting the mask region.

6. The displaying method according to claim 5, wherein receiving the input of the information of selecting the mask region includes:
    receiving a drawing input with respect to the first image, and
    the information of selecting the mask region includes information of a pixel specified by the drawing input.

7. The displaying method according to claim 6, wherein receiving the input of the information of selecting the mask region further includes:
    canceling at least a part of the drawing input.

8. The displaying method according to claim 5, wherein receiving the input of the information of selecting the mask region includes:
    specifying any pixel of the first image as a pixel constituting the mask region, or any pixel of the first image as a pixel constituting the non-mask region.

9. The displaying method according to claim 1, further comprising:
    displaying, on the interface, a probability distribution indicating a probability of each pixel of the first image being in the mask region or the non-mask region; and
    displaying, on the interface, a field for receiving the input of the threshold value from the user, the threshold value being a value used for determining whether each pixel of the first image is a pixel constituting the mask region.

10. The displaying method according to claim 1, wherein the threshold value is based on RGB values.

11. A non-transitory computer-readable storage medium storing a program, the program causing a computer to:
    display an interface for receiving an input of a threshold value from a user;
    generate, by using the threshold value, a second image showing a mask region of a first image that is a region where an input image is to be displayed on an article or a non-mask region of the first image that is a region where the input image is not displayed on the article, the mask region being set in accordance with a shape of the article; and
    display a projection image obtained by superimposing the second image on the input image.

12. The non-transitory computer-readable storage medium according to claim 11, the program further causing the computer to:
    display, on the interface, a probability distribution indicating a probability of each pixel of the first image being in the mask region or the non-mask region; and
    display, on the interface, a field for receiving the input of the threshold value from the user, the threshold value being a value used for determining whether each pixel of the first image is a pixel constituting the mask region.

13. The non-transitory computer-readable storage medium according to claim 11, wherein the threshold value is based on RGB values.

* * * * *